A. M. HULBERT.
CONTAINER.
APPLICATION FILED MAR. 24, 1914.
1,138,954.
Patented May 11, 1915.
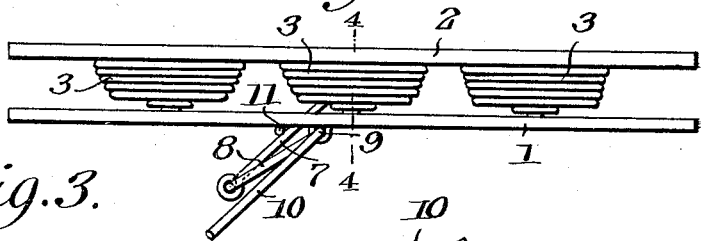
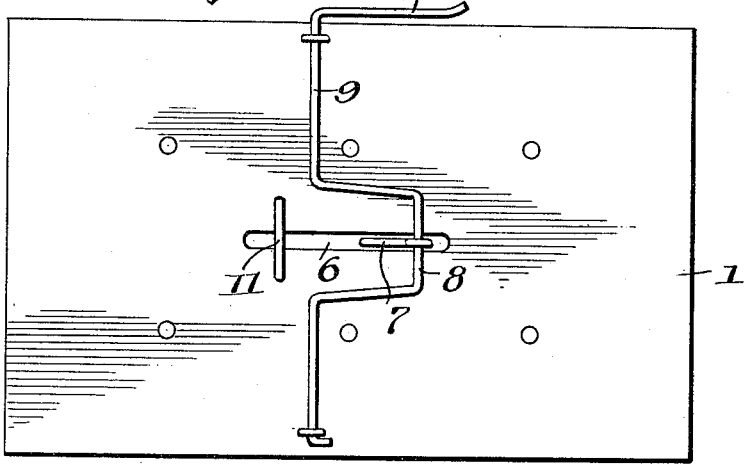
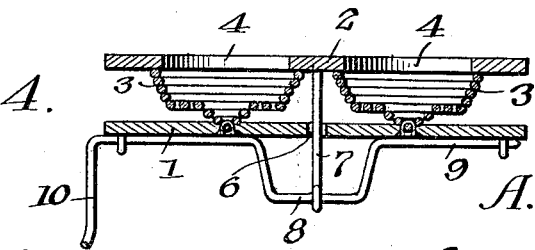
Witnesses
Hugh H. Ott
Inventor
A. M. Hulbert
By Victor J. Evans
Attorney

UNITED STATES PATENT OFFICE.

ALLEN M. HULBERT, OF ST. CLOUD, MINNESOTA.

CONTAINER.

1,138,954.

Specification of Letters Patent.

Patented May 11, 1915.

Application filed March 24, 1914. Serial No. 826,920.

*To all whom it may concern:*

Be it known that I, ALLEN M. HULBERT, a citizen of the United States, residing at St. Cloud, in the county of Stearns and State of Minnesota, have invented new and useful Improvements in Containers, of which the following is a specification.

This invention relates to containers and more particularly to egg containers.

The principal object of the invention is to provide simple and efficient egg compartments which may be conveniently and rapidly set up in operative position or collapsed to occupy small space in return shipment or storage.

Further objects of the invention will appear as the following description is read in connection with the accompanying drawing, which forms a part of this application, and in which:—

Figure 1 is a side elevation showing the device in open position. Fig. 2 is a similar view showing the device in collapsed position. Fig. 3 is a bottom plan view showing the parts arranged as in Fig. 1. Fig. 4 is a sectional view on the line 4—4 of Fig. 2.

In the specific embodiment of the invention, a plurality of egg holding sections are preferably mounted in any suitable form of collapsible crate which forms no part of this invention. Each of these sections comprises the bottom member 1 and a top member 2 connected to the bottom member by a plurality of helical springs 3 which have their upper coils surrounding and in register with openings 4 in the upper plate 2. When these springs are extended, as will be hereinafter described, the plates 1 and 2 are widely separated and the springs are in position to receive eggs which are preferably placed therein with a protective cover of cotton, felt or other similar material and a cover plate 5 placed thereover.

Connected to the upper plate 2 and extending downwardly between the coils and through a slot 6 in the lower plate 1 is a link 7 whose lower end is connected to a crank 8 formed on a crank shaft 9 and provided at its outer end with an operating handle 10. By turning the operating handle downwardly the crank is thrown away from the lower plate 1 and the upper plate is drawn toward the lower plate, thus pushing the eggs through the openings 4 and permitting their ready removal from the section. The crank extends beyond center, as shown in Fig. 2, so that it locks itself in operative position and thereby avoids the use of auxiliary locking devices. The crank is limited in its rearward movement by placing an abutment 11 across the slot 6 in the path of the link 7. In order that the bottom and top plates 1 and 2 may be held against collapse when not in use both of these plates are preferably provided with grooves adjacent their end edges so as to receive the cross pieces, as illustrated in Fig. 1. By regulating the size of the springs and the openings in the top plate the size of the eggs shipped may be readily determined.

What is claimed is:—

1. An egg container comprising a pair of plates one of which is apertured, collapsible egg containing members connected to said plates and means to draw the plates together and thereby collapse the egg containing members for exposing the eggs through the apertures.

2. An egg container comprising a pair of plates one of which is apertured, collapsible egg containers arranged between said plates and connected to both, said containers being open at one end and closed at the opposite end, their open ends registering with the apertures in the apertured plate and means to draw the plates together whereby the containers are collapsed and the eggs exposed through the apertures, together with a cover for the apertured plate.

3. An egg container comprising a pair of plates one of which is apertured, helical springs interposed between the plates and connected to both of them, said helical springs having one end open and the opposite end closed, the open end in register with the apertures in the apertured plate, a crank shaft journaled to one of the plates and a connection between the crank on the crank shaft and the opposite plate.

In testimony whereof I affix my signature in presence of two witnesses.

ALLEN M. HULBERT.

Witnesses:
   GEO. R. WHITNEY,
   JOHN H. WOLTER.

Copies of this patent may be obtained for five cents each, by addressing the "Commissioner of Patents, Washington, D. C."